United States Patent Office 3,521,739
Patented July 28, 1970

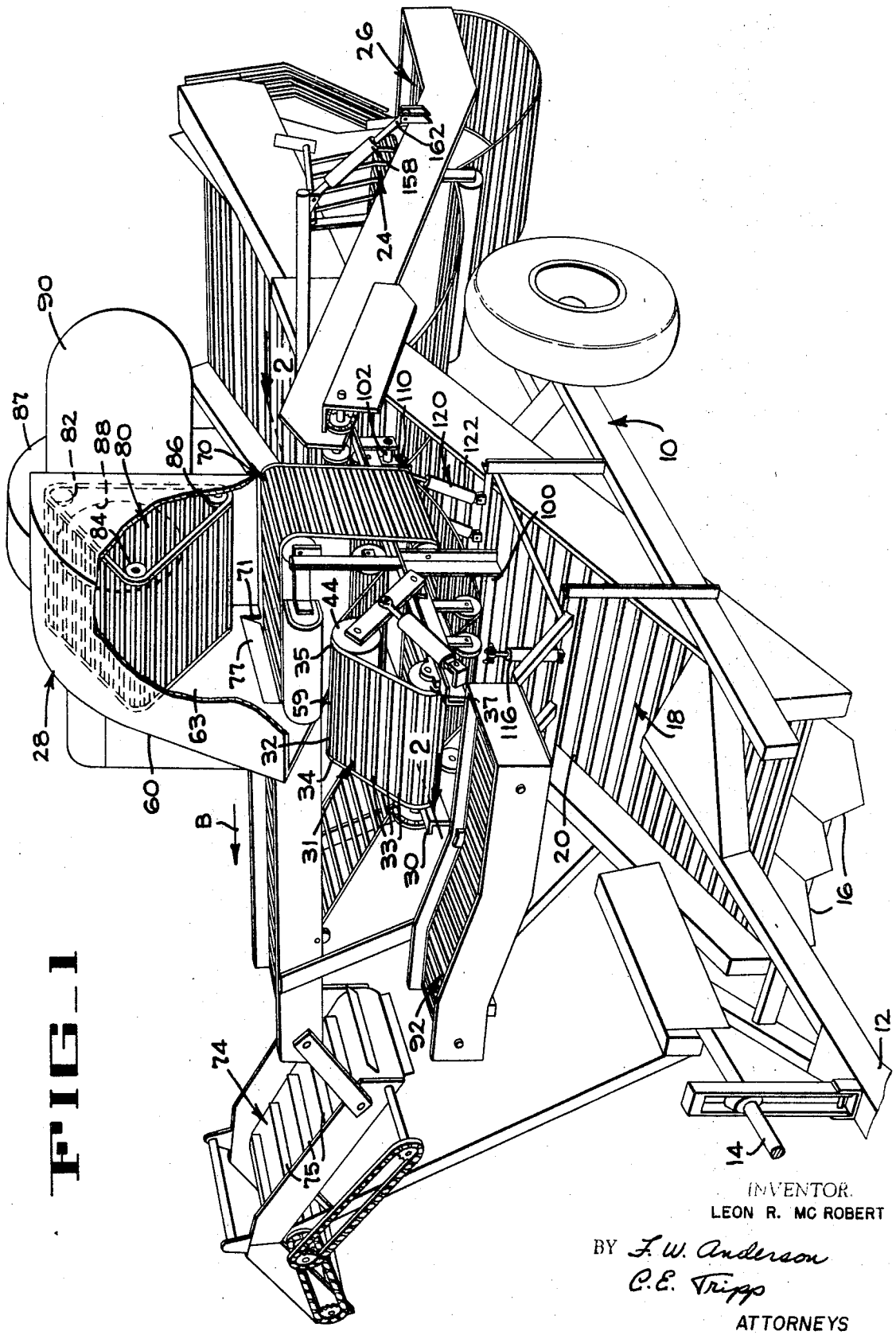

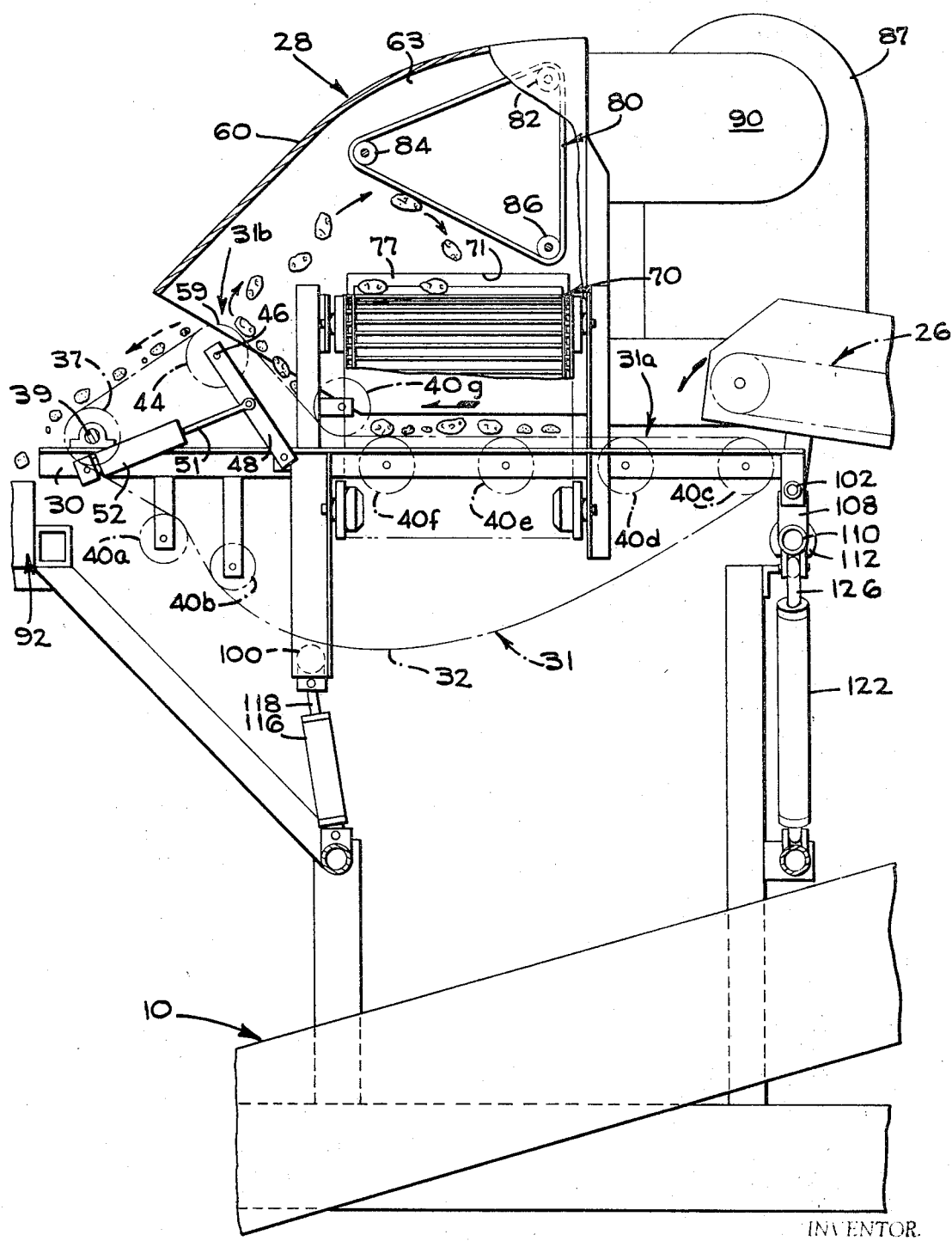

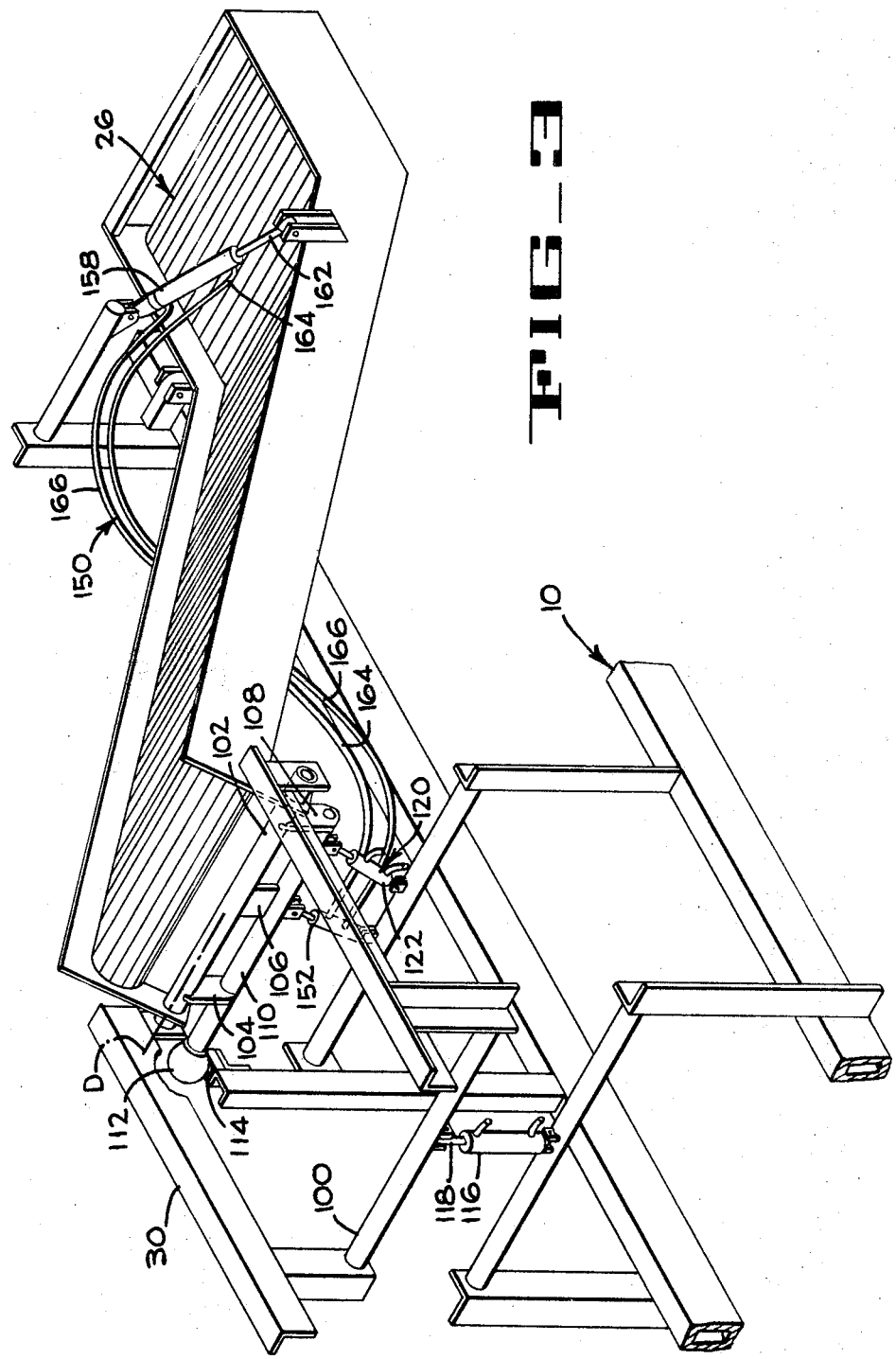

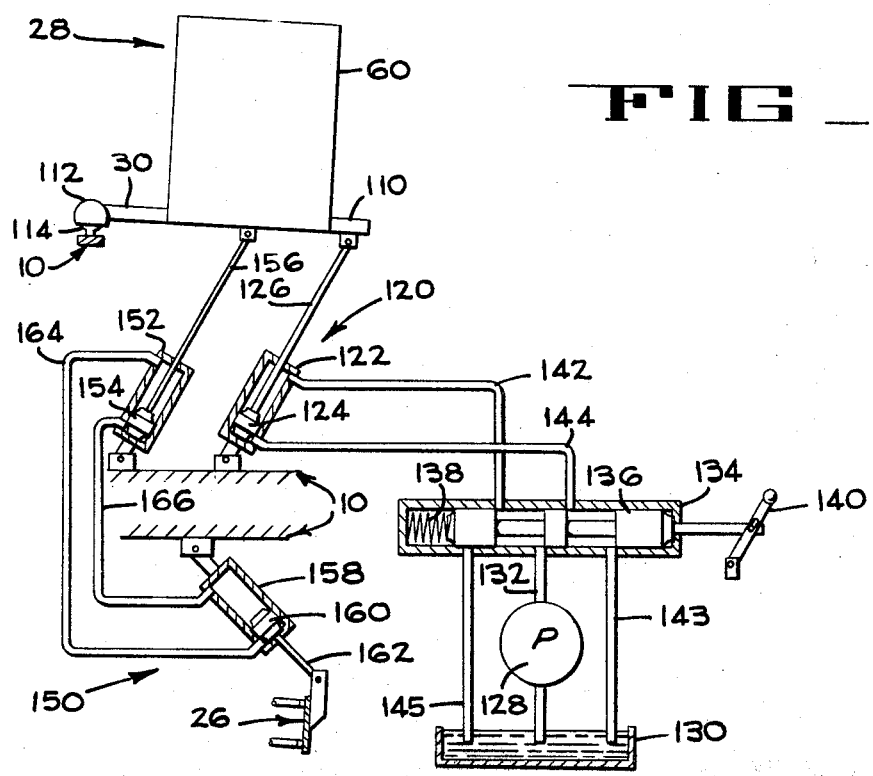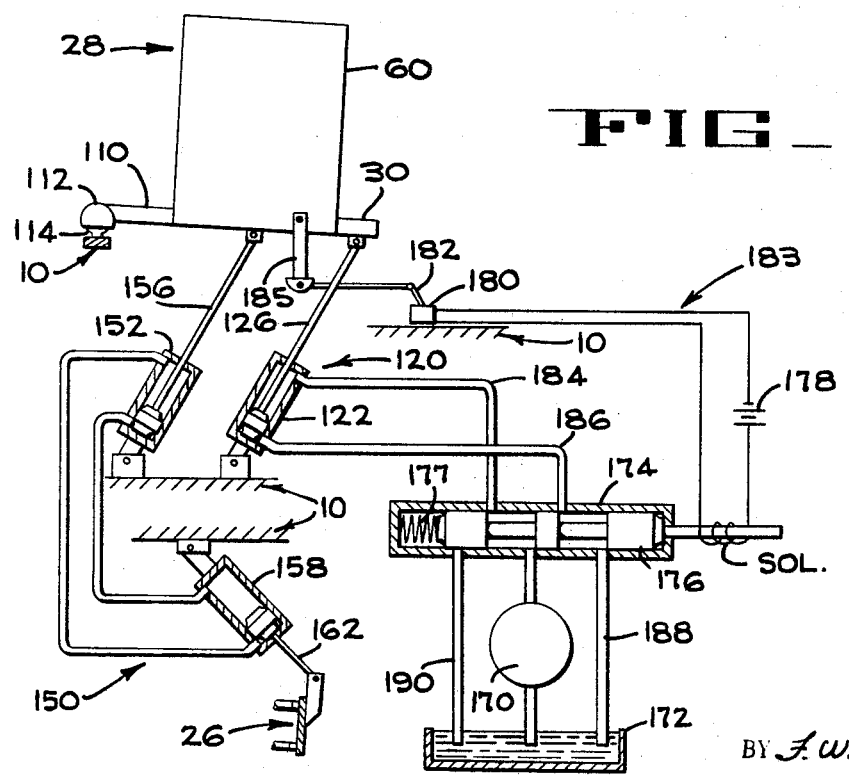

1

3,521,739
CONVEYOR LEVELING MECHANISM FOR
HARVESTING MACHINE
Leon R. McRobert, Williamston, Mich., assignor to FMC
Corporation, San Jose, Calif., a corporation of Delaware
Filed Apr. 10, 1968, Ser. No. 720,195
Int. Cl. B65g 37/00
U.S. Cl. 198—102                                    5 Claims

ABSTRACT OF THE DISCLOSURE

A machine for harvesting potatoes has mechanism for tilting some conveyors thereon relative to the frame of the machine to maintain an even distribution of potatoes on the conveyors. The machine has an upwardly sloping elevating conveyor, and a separating conveyor with a receiving section which is pivotally connected to the upper end of the elevating conveyor. During level travel of the machine, potatoes and debris are carried up the elevating conveyor to the separating conveyor receiver section which is horizontal. A humped section of the separating conveyor lifts the potatoes and debris from the receiving section into an air stream which carries the less dense potatoes onto a potato removal conveyor. A first hydraulic ram maintains the receiving section of the separating conveyor level in the longitudinal direction and a second hydraulic ram maintains that conveyor section level in the lateral direction. Master and slave cylinders and pistons tilt the elevating conveyor laterally on the frame of the machine in accordance with lateral tilt of the receiving section relative to the frame. Manual or automatic control can be used to maintain the conveyors level in the lateral direction.

BACKGROUND OF THE INVENTION

The present invention relates to a crop harvesting machine and, more particularly, to improved crop conveying mechanism therein.

In a typical crop harvesting machine, such as a potato harvester, a mixture of stones, debris, and potatoes, which has been gathered from the ground, is carried by an elevating conveyor to a separating mechanism for the separation of the potatoes from the stones and debris. The separating mechanism generally includes a conveyor having a section which is level as the machine travels over level ground. In the potato harvester disclosed in the copending U.S. patent application of Sackett and McRobert entitled Harvesting Apparatus, Ser. No. 571,842, filed Aug. 11, 1966 and assigned to the same assignee as the present invention, the conveyor in the separating mechanism has a hump to lift the mixture of potatoes, stones, and debris into an air stream which carries the less dense potatoes to a potato removal conveyor.

The section of the conveyor in the separating mechanism which extends between the elevating conveyor and the hump should remain level, to assure an even distribution of potatoes fed to the hump, for the most effective separation of the potatoes from the debris and stones. Generally, in any harvesting machine, a separation of the fruit or crops from debris can be most effectively accomplished when the mixture is evenly distributed. Consequently, in the usual harvesting machine, movement of the machine over hilly ground causes the fruit or crops

2 on the conveyor in the separating mechanism to pile up, resulting in less effective separation of the crops from the stones and debris.

Heretofore, there has been provided, in a separating mechanism of a harvester, a conveyor which can be tilted in the longitudinal direction (that is, the fore and aft direction) when the machine goes up or down a hill to minimize piling up of the crops on the conveyor. This previous arrangement, however, has not prevented a bunching of the fruit or crops on one side or the other of the conveyor when the machine is moved along the side of the hill.

SUMMARY OF THE INVENTION

In the present invention there is provided mechanism to tilt the conveyor in a harvesting machine laterally to maintain the conveyor level when the machine traverses the side of a hill. In the preferred form of the invention, the elevating conveyor is pivotally connected on a lateral axis with the conveyor in the separating mechanism. The elevating conveyor is pivotally connected to the frame of the machine for lateral tilting relative to the frame. The separating conveyor (that is, the conveyor in the separating mechanism) is pivotally connected to the frame on the lateral axis at which the two conveyors are connected for universal movement relative to the frame. A first hydraulic ram is connected between the front of the separating conveyor and the frame to tilt that conveyor longitudinally with respect to the frame and with respect to the elevating conveyor. A second hydraulic ram is connected between the frame and one side of the separating conveyor at the lateral axis on which the two conveyors are connected to tilt the separating conveyor laterally. A master cylinder and piston is also connected between the frame and the separating conveyor on that same axis. The master cylinder is connected to, and controls, the cylinder of a slave cylinder and piston which is connected between the frame and the elevating conveyor. Thus, when the machine is traversing the side of the hill and the separating conveyor is tilted laterally with respect to the frame by the hydraulic ram connected between the frame and the separating conveyor, the master cylinder and piston is activated to actuate the slave cylinder and piston to effect a lateral tilting of the elevating conveyor which is coordinated with the lateral tilting of the separating conveyor. In this manner, the lateral attitude of both conveyors is maintained level regardless of the attitude of the machine.

It is therefore one object of the present invention to improve the separation of the gathered crops from debris in a harvesting machine. It is another object of the present invention to maintain a conveyor in a harvesting machine level even though the machine traverses the side of a hill. It is yet another object of the present invention to maintain two conveyors level in a harvesting machine. It is still another object of the present invention to provide mechanism to coordinate the attitude of two conveyors.

BRIEF DESCRIPTION OF THE DRAWINGS

FIG. 1 is a fragmentary diagrammatic perspective, with parts broken away, of a harvesting machine in which the mechanism of the present invention is incorporated;

FIG. 2 is an enlarged diagrammatic vertical section taken on line 2—2 of FIG. 1;

FIG. 3 is a fragmentary diagrammatic perspective, with parts eliminated for clarity, taken approximately as the view of FIG. 1;

FIG. 4 is a partial schematic hydraulic diagram for the machine of FIG. 1; and

FIG. 5 is an alternate partial schematic hydraulic diagram for the machine of FIG. 1.

In the embodiment of the invention disclosed in FIG. 1, the reference numeral 10 indicates generally a wheeled frame of a potato harvester which has a drawbar 12 adapted to be connected to a tractor. A drive shaft 14 is arranged to be connected to the power takeoff shaft of the tractor to provide driving power for the several drive mechanisms that are connected to the conveyors of the potato harvester. A plurality of sharpened digger blades 16 are mounted at the forward end of the frame. As the chassis is towed forwardly, the blades dig the potatoes and potato vines from the ground and direct the potatoes, vines, and debris onto the conventional conveyor 18. Conveyor 18 has an endless belt made up of spaced, transverse rods which define an upwardly and rearwardly inclined run 20. Run 20 conveys the material to an upper rear portion of the machine where the dirt and vines are removed. The potatoes and stones are dropped from run 20 onto the endless transverse rod belt of conveyor 24. Conveyor 24 has an endless belt that delivers the potatoes and stones received thereon to the endless rod-type belt of an elevating conveyor 26 which is inclined upwardly and forwardly. The conveyors 18, 24 and 26 may be of the type disclosed in the patent to McRobert U.S. 3,225,771.

A separating mechanism 28 is mounted on the base 30 of a conveyor 31 having a short endless rod-type conveyor belt 32. Conveyor 31 has a receiving section 31a (see FIG. 2) arranged to receive the potatoes from the upper end of conveyor 26, and a separating section 31b. The conveyor belt 32 is made up of a plurality of spaced rods 33 (FIG. 1) each of which has its end portions secured, as by riveting, to inwardly projecting tabs formed in conventional manner on the links of two endless chains 34 and 35. The chains 34 and 35 are trained over two drive sprockets 37 that are keyed to a powered drive shaft 39 journaled in base 30. The chains 34 and 35 pass over pairs 40a, 40b, 40c, 40d, 40e, 40f and 40g of transversely aligned guide pulleys mounted on base 30. The conveyor belt 32 is also trained around a roller 44 that is rotatably mounted on a shaft 46. Shaft 46 is secured in the outer ends of two identical, transversely aligned levers 48, each of which is pivoted at one end on base 30. A piston rod 51 of a double acting hydraulic power cylinder 52, which is pivotally connected to the base, is pivotally connected to an intermediate portion of the lever 48 as shown in FIG. 2. By actuating the cylinder 52 (by means not shown) the position of the guide roller 44, which is in the separating section 31b of the conveyor 31, can be changed. As seen in FIG. 2, the sprockets and the rollers over which the conveyor belt is trained are so arranged that the conveyor belt has a flat upper run in section 31a, and inclined portions that define a hump 59 in separating section 31b toward which the potatoes and rocks gathered therewith are carried.

The separating mechanism 28 includes a housing 60 which has an open lower end overlying the separating section 31b of conveyor 31. Mounted within the housing 60 is one end of a conveyor 70 that extends laterally across the housing and passes through a rectangular opening 71 in the side wall of the housing. The conveyor 70 has an endless rod-type belt, the upper run of which moves in the direction of arrow B (FIG. 1) and delivers potatoes to an endless discharge conveyor 74 that has spaced flights 75 thereon. The opening 71 in side wall 63 is covered by a flexible closure 77 which may be made of canvas or the like and is arranged to hang down over the opening on the outside of the hood to permit potatoes to be carried out of the hood by the belt 70 while preventing air from being drawn into the hood through opening 71. An endless belt 80, constructed of spaced rods in the same manner as conveyor belt 32, is mounted on spaced rollers 82, 84, and 86 which are journaled in the housing 60. One of the rollers is power driven to continuously drive the endless belt 80. A blower 87 adjacent the housing 60 draws air through the open lower end of housing 60, through the belt 80, and through the opening 88 to duct 90 which leads to the blower.

When the harvester is traversing level ground, the mixture of potatoes and stones collected therewith are carried up conveyor 26 to conveyor 31 and up the hump 59 on conveyor belt 32 into the high velocity air stream that is being drawn into the housing 60. The hump causes the potatoes and stones to move relative to each other while in the air stream and, since the potatoes are lighter in relation to their surface area than are the stones, the potatoes are lifted while the stones remain on the conveyor belt 32 and are discharged onto a takeaway conveyor 92.

The potatoes continue to move with the air stream until they contact the belt 80 which operates to prevent the potatoes from being carried across the housing and into the blower suction port 88. Instead, each potato is held against the belt until the belt rotates counterclockwise (FIG. 2) to a position where the force of the air stream is no longer sufficient to hold the potato against the surface of the belt. At this point, the potato drops onto the conveyor 70 which carries it out of the housing. The hump 59 can be adjusted by actuation of cylinder 52 (by conventional control means not shown) to produce the best separation of potatoes from the rocks.

As shown best in FIG. 3, the base 30 has a forward transverse bar 100 and a rear transverse bar 102. The upper end of conveyor 26 is pivotally connected to rear transverse bar 102, which is secured in parallel relation by struts 104, 106 and 108 to a support bar 110. A socket 112 at the inner end of support bar 110 is received on a ball member 114 secured to frame 10. The forward end of base 30 is supported on frame 10 by a double acting hydraulic cylinder 116 which is pivotally connected to frame 10 and which has a piston rod 118 pivotally connected to the transverse bar 100 of base 30. The actuation of cylinder 116 by conventional manually operated hydraulic control means (not shown) permits the machine operator to tilt the base 30 in the fore and aft direction relative to the frame (that is, in the direction of travel of potatoes on the endless driven belt 32 of conveyor 31) when the harvester frame is tilted in the fore and aft direction as the harvester moves up or down a hill. Since the base 30 is pivotally connected to elevating conveyor 26 on a horizontal axis D defined by bar 102, the base can be tilted fore and aft with respect to the frame even though the elevating conveyor is not tilted in the fore and aft direction. Thus, an even flow of potatoes can be maintained up the hump 59 despite any fore and aft tilting of the harvester frame on a hill.

Actuation of cylinder 116 can not, however, prevent an accumulation of potatoes on one side or the other of conveyors 26 or 31 if the frame 10 is tilted laterally as when the harvester traverses the side of a hill. If the potatoes are bunched on one side or the other of the conveyor belt 32 as they move up the hump 59, the potatoes will not be as effectively separated from the rocks as when evenly distributed on conveyor belt 32, and many potatoes are likely to be discarded with the rocks. To prevent bunching of the potatoes on one side or the other of conveyor belt 32, mechanism is provided to tilt conveyor 31 laterally with respect to the frame. Since the distribution of potatoes on belt 32 will depend to some extent on the distribution of potatoes on the endless belt of conveyor 26, mechanism is also provided to tilt conveyor 26 laterally with respect to the frame.

As shown best in FIG. 3, an actuator 120 is connected between frame 10 and transverse support bar 110 of platform 30. Actuator 120, as shown in FIGS. 3 and 4, comma piston 124 having a piston rod 126 pivotally connected to bar 110 of base 30. A pump 128 delivers hydraulic fluid from sump 130 to pressure line 132 which is comprises a cylinder 122 pivotally connected to frame 10, and nected to the pressure port of control valve 134. The valve has a valve member 136 which is movable selectively, by spring 138 and handle 140, to divert fluid pressure to one or the other of the cylinder lines 142, 144. When the valve member 136 is to the right and in the position shown in FIG. 4, pressure fluid passes from pump 128 through valve 134 to line 142 connected to the upper end of the cylinder. This lowers the piston to lower the outer side (the side remote from the ball and socket) of the base 30. Fluid from beneath the piston passes through line 144, valve 134, and discharge line 143 to the sump. Conversely, when the valve member 136 is to the left of the position shown in FIG. 4, fluid from pump 128 passes through the valve to line 144 to raise the piston 124 and to raise the outer edge of base 30. Fluid above the piston passes through line 142, valve 134, and discharge line 145 to the sump. Thus, the conveyor 31, which includes base 30, can be tilted laterally to raise or lower the outer edge by manipulation of control handle 140 by the machine operator when traversing the sides of hills or uneven ground to maintain an even distribution of potatoes on conveyor 31, and particularly on the receiving end, or section, 31a thereof, immediately upstream from the hump 59 in the separating section 31b of the conveyor.

The maintenance of an even distribution of potatoes on conveyor 31 is facilitated by mechanism to maintain elevating conveyor 26 level in the lateral direction so that the potatoes fed to the receiving end 31a of conveyor 31 are evenly distributed. This is accomplished by a closed hydraulic system, indicated generally at 150. As shown best in FIGS. 3 and 4, closed hydraulic system 150 comprises a master cylinder 152 having a piston 154 slidably received therein. The master cylinder 152 is pivotally connected at one end to frame 10 and the piston 154 is pivotally connected by rod 156 to the transverse platform bar 110. Thus, as the outer edge of the platform 30 is raised or lowered, the piston 154 is raised or lowered in master cylinder 152.

A slave cylinder 158 is pivotally connected to frame 10 above elevating conveyor 26 as shown in FIG. 3. Cylinder 158 slidably receives a piston 160 which is connected by rod 162 to the outer edge of conveyor 26. The upper end of master cylinder 152 is hydraulically connected by line 164 to the lower end of slave cylinder 158, and the lower end of cylinder 152 is hydraulically connected by line 166 to the upper end of cylinder 158. Thus, as piston 154 in master cylinder 152 is raised or lowered by movement of base 30 by actuator 120, the piston 160 in slave cylinder 158 is raised and lowered, respectively, to raise and lower the outer edge of conveyor 26. Slave cylinder 158 and piston 160 therefore define an actuator to tilt the conveyor 26 laterally relative to the frame 10. Thus, the conveyor 26 can be tilted laterally in coordinated relation with the conveyor 31 relative to the frame so that both conveyors can be held level in the lateral direction when the harvester is on the side of a hill. With elevating conveyor 26 level in addition to conveyor 31, the potatoes fed to conveyor 31 from conveyor 26 will be evenly distributed.

With the hydraulic system shown in FIG. 4, the conveyors 26 and 31 are maintained level by manual control 140. With the system shown in FIG. 5, the conveyors 26 and 31 are maintained level in the lateral direction automatically. A pump 170 takes fluid from a sump 172 and delivers it under pressure to the pressure port of a valve 174. Valve 174 has a solenoid operated valve member 176 which is shiftable from the position shown to the left when energized by power source 178 on closure of switch 180 as switch arm 182 moves to the right. The switch arm 182 is connected to a pendulum 185 mounted on the base 30. The switch 180 is mounted on the frame 10 and when the frame tilts, the pendulum, which tends to remain vertical, operates the switch arm 182 to move the arm to the right or left. Movement of the switch arm to the left opens the circuit 183 to de-energize the solenoid SOL so that valve member 176 is moved to the position shown by spring 177. With valve member 176 in the position shown, fluid from pump 170 passes through the valve to cylinder line 184 which is in communication with cylinder 122 above the position. Fluid below the piston passes through line 186, valve 174, and discharge line 188 to the sump. Movement of the switch arm 182 to the right closes the circuit to energize the solenoid SOL so that the valve member 176 is shifted to the left of the position shown. When valve member 176 is shifted to the left, fluid passes from pump 170, through valve 174, to line 186 to enter cylinder 122 below the piston. Fluid above the piston escapes through line 184, valve 174, and discharge line 190 to the sump.

Although the best mode contemplated for carrying out the present invention has been herein shown and described, it will be apparent that modification and variation may be made without departing from what is regarded to be the subject matter of the invention.

Having completed a detailed description of the invention so that those skilled in the art could practice the same, I claim:

1. In a harvesting machine having separating mechanism to separate the crop from debris, said separating mechanism including a conveyor section, the machine having a frame and having an inclined elevating conveyor terminating at the upper end at said separating mechanism conveyor, the combination comprising means to mount said separating mechanism conveyor section in the harvesting machine for lateral tilting about a longitudinal axis relative to the frame, and for longitudinal tilting about a lateral axis relative to the frame and relative to the elevating conveyor, means to mount said elevating conveyor in the harvesting machine for lateral tilting relative to the frame, a first actuator mounted between the frame and said separating mechanism conveyor to tilt the separating mechanism conveyor longitudinally relative to the frame, a second actuator mounted between the frame and said separating mechanism conveyor to tilt the separating mechanism conveyor laterally relative to the frame, and a third actuator mounted between the frame and the elevating conveyor operable to tilt the elevating conveyor laterally relative to the frame in response to lateral tilt only of the separating mechanism conveyor section relative to the frame.

2. The apparatus of claim 1 in which said third actuator comprises a master cylinder connected between the frame and the separating mechanism conveyor section and a slave cylinder connected between the frame and elevating conveyor.

3. The apparatus of claim 1 including a pendulum to detect the level of the separating mechanism conveyor section, and means responsive to said pendulum to operate said first and second actuator.

4. The apparatus of claim 2 in which said master cylinder is connected to the separating mechanism conveyor section on the lateral axis about which the separating mechanism conveyor is tiltable longitudinally and at a position spaced from the longitudinal axis about which the separating mechanism conveyor is tiltable laterally.

5. In a harvesting machine having separating mechanism to separate the crop from debris, said separating mechanism including a conveyor section, the machine having a frame and having an inclined elevating conveyor terminating at the upper end at said separating mechanism conveyor, the combination comprising means to tilt the separating mechanism conveyor section longitudinally and laterally, means to tilt said inclined elevating conveyor laterally, and means responsive to lateral tilt only of the separating mechanism conveyor section to determine the extent of tilt of said elevating conveyor.

References Cited

UNITED STATES PATENTS

| | | | |
|---|---|---|---|
| 2,761,578 | 9/1956 | Brownlee | 198—101 |
| 2,785,789 | 3/1957 | Slomer | 198—208 |
| 3,260,345 | 7/1966 | Scholler | 198—101 |
| 3,402,805 | 9/1968 | Spellman | 198—117 |

RICHARD E. AEGERTER, Primary Examiner

U.S. Cl. X.R.

198—117; 56—210

PO-1050
(5/69)

UNITED STATES PATENT OFFICE
CERTIFICATE OF CORRECTION

Patent No. 3,521,739      Dated July 28, 1970

Inventor(s) L. R. MC ROBERT

It is certified that error appears in the above-identified patent and that said Letters Patent are hereby corrected as shown below:

Column 4, line 74 - after "com-" insert --prises a cylinder 122 pivotally connected to frame 10, and--.
Column 5, line 3 - delete the whole line.
Column 5, line 55 - delete "an actuator" (first occurrence).
Column 6, line 10 - change "position" to --piston--.

Signed and sealed this 14th day of September 1971.

(SEAL)
Attest:

EDWARD M. FLETCHER, JR.
Attesting Officer

ROBERT GOTTSCHALK
Acting Commissioner of Patents